US012789538B2

(12) United States Patent
Riboni

(10) Patent No.: US 12,789,538 B2
(45) Date of Patent: Nov. 10, 2026

(54) PRETREATMENT DEVICE AND INK JET DIGITAL PRINTING MACHINE INCLUDING SAID PRETREATMENT DEVICE

(71) Applicant: QUANTIX DIGITAL S.r.l., Vigevano (IT)

(72) Inventor: Ivan Riboni, Vigevano (IT)

(73) Assignee: QUANTIX DIGITAL S.r.l., Vigevano (IT)

(*) Notice: Subject to any disclaimer, the term of this patent is extended or adjusted under 35 U.S.C. 154(b) by 234 days.

(21) Appl. No.: 18/566,387

(22) PCT Filed: May 27, 2022

(86) PCT No.: PCT/EP2022/064399
§ 371 (c)(1),
(2) Date: Dec. 1, 2023

(87) PCT Pub. No.: WO2022/258396
PCT Pub. Date: Dec. 15, 2022

(65) Prior Publication Data

US 2025/0083459 A1 Mar. 13, 2025

(30) Foreign Application Priority Data

Jun. 8, 2021 (IT) ........................ 102021000014864

(51) Int. Cl.
*B41J 11/00* (2006.01)
*B41J 3/407* (2006.01)
(Continued)

(52) U.S. Cl.
CPC ......... *B41J 11/0015* (2013.01); *B41J 3/4073* (2013.01); *B41J 3/40731* (2020.08);
(Continued)

(58) Field of Classification Search
CPC .................. B41J 11/0015; B41J 3/4073; B41J 3/40731; B41J 3/40733; B41J 25/316; B41J 29/377
See application file for complete search history.

(56) References Cited

U.S. PATENT DOCUMENTS 8,667,895 B2 3/2014 Gerigk et al.
9,527,305 B2 12/2016 Dubuit
(Continued)

FOREIGN PATENT DOCUMENTS

EP 3088189 A1 11/2016
EP 3156242 A1 4/2017
(Continued)

OTHER PUBLICATIONS

International Search Report and Written Opinion dated Aug. 12, 2022, from corresponding International Application No. PCT/EP2022/064399.

*Primary Examiner* — Henok D Legesse
(74) *Attorney, Agent, or Firm* — Troutman Pepper Locke LLP

(57) ABSTRACT

The pretreatment device for pretreating at least one container with a longitudinal axis having an outer surface to be subjected to ink jet digital printing, comprises plasma emitting means, a table supporting at least one support spindle supporting the at least one container, wherein the table has an axis of rotation, wherein the spindle has an axis oriented radially with respect to the rotation axis of the table, wherein the table is configured to carry and park the spindle at an exposure position in which the outer surface of the container is exposed to the plasma.

12 Claims, 16 Drawing Sheets

(51) Int. Cl.

| | |
|---|---|
| ***B41J 25/316*** | (2006.01) |
| ***B41J 29/377*** | (2006.01) |

(52) U.S. Cl.

CPC ......... *B41J 3/40733* (2020.08); *B41J 25/316* (2013.01); *B41J 29/377* (2013.01)

(56) References Cited

U.S. PATENT DOCUMENTS

| | | | |
|---|---|---|---|
| 9,908,324 B1 | 3/2018 | Enge et al. | |
| 10,696,068 B2 | 6/2020 | Weber et al. | |
| 2004/0091633 A1* | 5/2004 | Wilson, II | B29C 59/10 219/121.36 |
| 2016/0221328 A1* | 8/2016 | Till | B41F 23/007 |
| 2018/0304643 A1* | 10/2018 | LeStrange | H01J 37/32009 |
| 2019/0105925 A1* | 4/2019 | Dubuit | B41J 3/4073 |
| 2023/0058773 A1* | 2/2023 | Weber | B41J 3/413 |

FOREIGN PATENT DOCUMENTS

| | | | |
|---|---|---|---|
| EP | 3678790 A1 | 7/2020 | |
| EP | 3678790 B1 * | 3/2022 | B41F 23/04 |

* cited by examiner

PRETREATMENT DEVICE AND INK JET DIGITAL PRINTING MACHINE INCLUDING SAID PRETREATMENT DEVICE

CROSS-REFERENCE TO RELATED APPLICATIONS

The present application is a U.S. National Phase Application under 35 U.S.C. § 371 of International PCT/EP2022/064399 filed May 27, 2022, which claims priority of Italian Patent Application No. 102021000014864 filed Jun. 8, 2021. The entire contents of which are hereby incorporated by reference.

FIELD OF THE INVENTION

The present invention refers to a pretreatment device for pretreating containers to be subjected to ink jet digital printing.

BACKGROUND

In some solutions present on the market for printing on containers that are cylindrical or in another shape, a rotary table is envisaged which is provided with support spindles supporting the containers.

The rotary table rotates to position the spindles at the next printing stations in each of which special printing heads apply different color ink between one printing station and the other.

When parked at a printing station, the spindle rotates on itself to expose the entire side surface of the containers to the printing heads.

The application of inks on various surfaces, for example the outer side surface of containers used as packaging, requires that the substrate to be printed is perfectly clean, therefore free from oily residues that can come from the production process of the container itself.

For this reason, the containers before printing are subjected to a water and detergent washing and subsequent drying.

These industrial processes prior to ink jet printing have a high ecological impact as they are highly energy-intensive and involve a high consumption of water.

In addition, to ensure the necessary printing quality, the containers to be printed must have an adequate surface tension.

In fact, for the ink drop applied to the container to have a correct shape behavior, in order to compose the image with control over the size of the drop outline on the container, it is necessary that the surface tension of the container assumes adequate values defined by the technical specifications of the ink used.

The technical task proposed by the present invention is, therefore, to make a pretreatment device for pretreating containers to be subjected to ink jet digital printing which makes it possible to eliminate the cited technical drawbacks of the prior art.

Within the context of this technical task, an object of the invention is to make an eco-sustainable and energy-efficient pretreatment device.

Another object of the invention is to make a pretreatment device that contributes to the improvement of the printing quality.

Another object of the invention is to make a pretreatment device that contributes to the improvement of the print production capacity and the reduction of waste of an ink jet digital printing machine.

Another object of the invention is to make a pretreatment device that contributes to the achievement of repeatable printing results.

SUMMARY

The technical task, as well as these and other purposes, according to the present invention are achieved by making a pretreatment device for pretreating at least one container with a longitudinal axis having an outer surface to be subjected to ink jet digital printing, characterized in that it comprises plasma emitting means, a table supporting at least one support spindle supporting said at least one container, wherein said table has an axis of rotation, wherein said at least one spindle has an axis oriented radially with respect to said rotation axis of said table, wherein said table is configured to carry and park said at least one spindle at an exposure position in which said outer surface of said at least one container is exposed to the plasma.

Plasma surface treatment is particularly beneficial for the following reasons.

The application generates a moderate amount of heat: this is of great help for the installation inside the printing machine, where there are electronic and fluid dynamic elements that can be affected by too high temperatures.

The use of a modular construction for the plasma emitting means allows the installation to be adapted so that the plasma beams created are coupled to the profile of the rotation solid to be printed (container).

The pretreatment device therefore makes it possible to perform an effective treatment of cleaning and preparation of the surface for printing in an extremely versatile way.

The pretreatment may be carried out during the rotation of the surface to be printed by at least one full turn, so as to expose each surface unit to the plasma source, at least once.

If several orders of plasma emitters are envisaged around the surface to be printed, the pretreatment can be performed during the rotation of the surface to be printed by less than one full turn.

The plasma emitters that activate the surface to be printed are preferably configured and arranged to work at a distance of between 1 and 2 millimeters from the same surface.

The pretreatment speed preferably coincides with the linear ink application speeds, e.g. about 50 meters/min.

With this working mode the surface tension can be raised by more than 12 mN/m, becoming suitable for receiving the ink drops that make up the image to be printed.

A specific application concerns the pretreatment of the shoulder of beverage cans.

This part of the cans is particularly critical, because it shows residual traces of lubricating oil, used in mechanical deformation matrices that carry out cylinder tapering.

Normally, use is made of oils for food use (colloidal dispersions) that can be removed by washing with hot water.

The action of the plasma produces similar results and allows an intensification of the pretreatment without multiplying the heat transmission, which could generate damage on the inner wall of the can, compromising the resistance thereof to the attacks brought by the packaged product.

According to the invention, in fact, plasma emitters distributed circumferentially around the surface to be printed of the can may be used.

In this way the pretreatment intensity is divided and at the same time the effectiveness of removal of the lubricating oil is achieved, because the pretreatment is repeated almost seamlessly.

Other features of the present invention are further defined in the following claims.

BRIEF DESCRIPTION OF THE DRAWINGS

Further features and advantages of the invention will become apparent from the description of a preferred, but not exclusive, embodiment of the apparatus of the ink jet digital printing machine for printing on substrates having a longitudinal axis according to the invention, which is illustrated by way of non-limiting example in the attached drawings, of which.

DETAILED-DESCRIPTION

Figure 1:
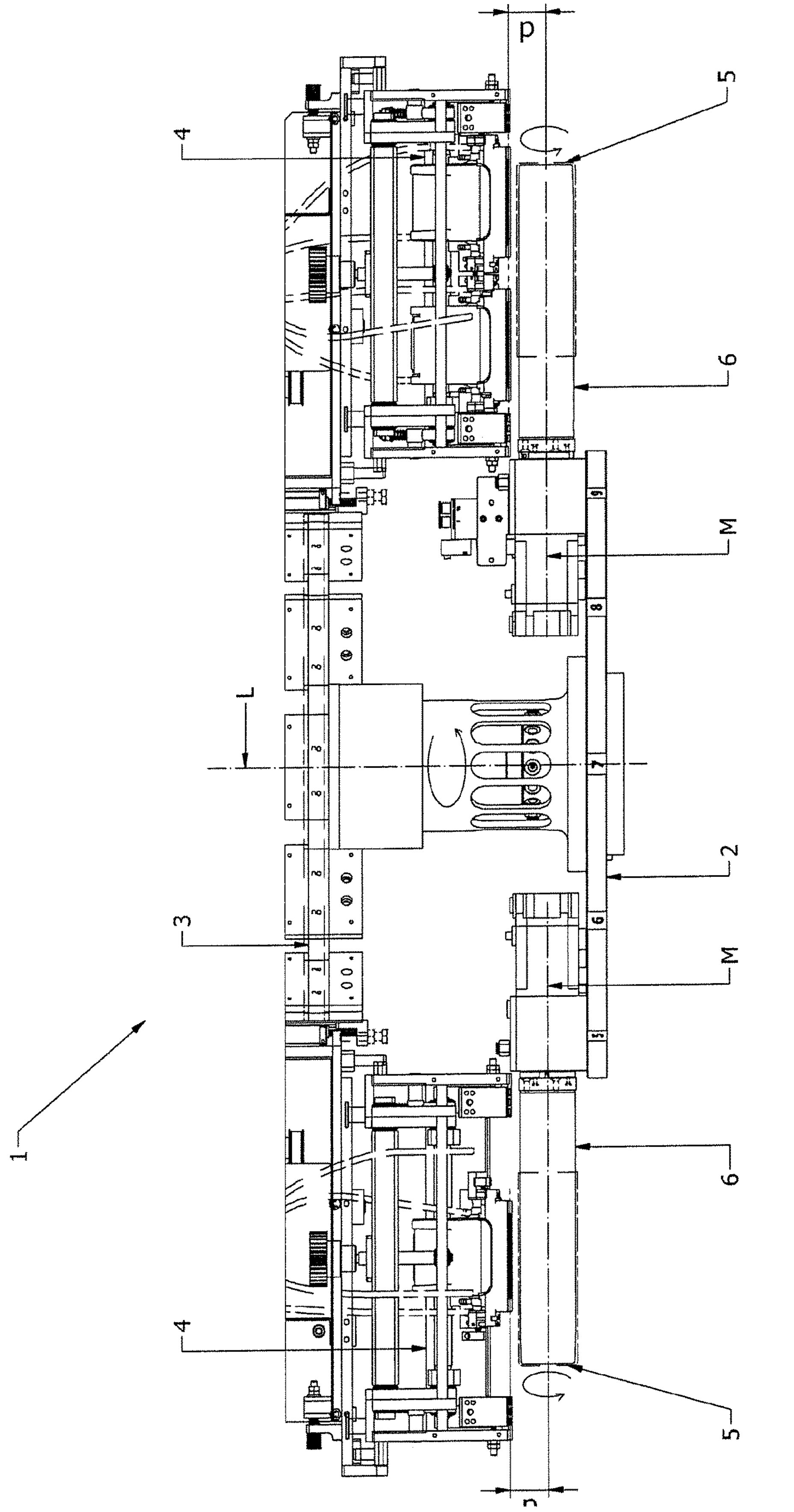
FIG. 1 shows a schematic side elevation view of the printing machine where for clarity only two printing stations are shown.
Figure 2:
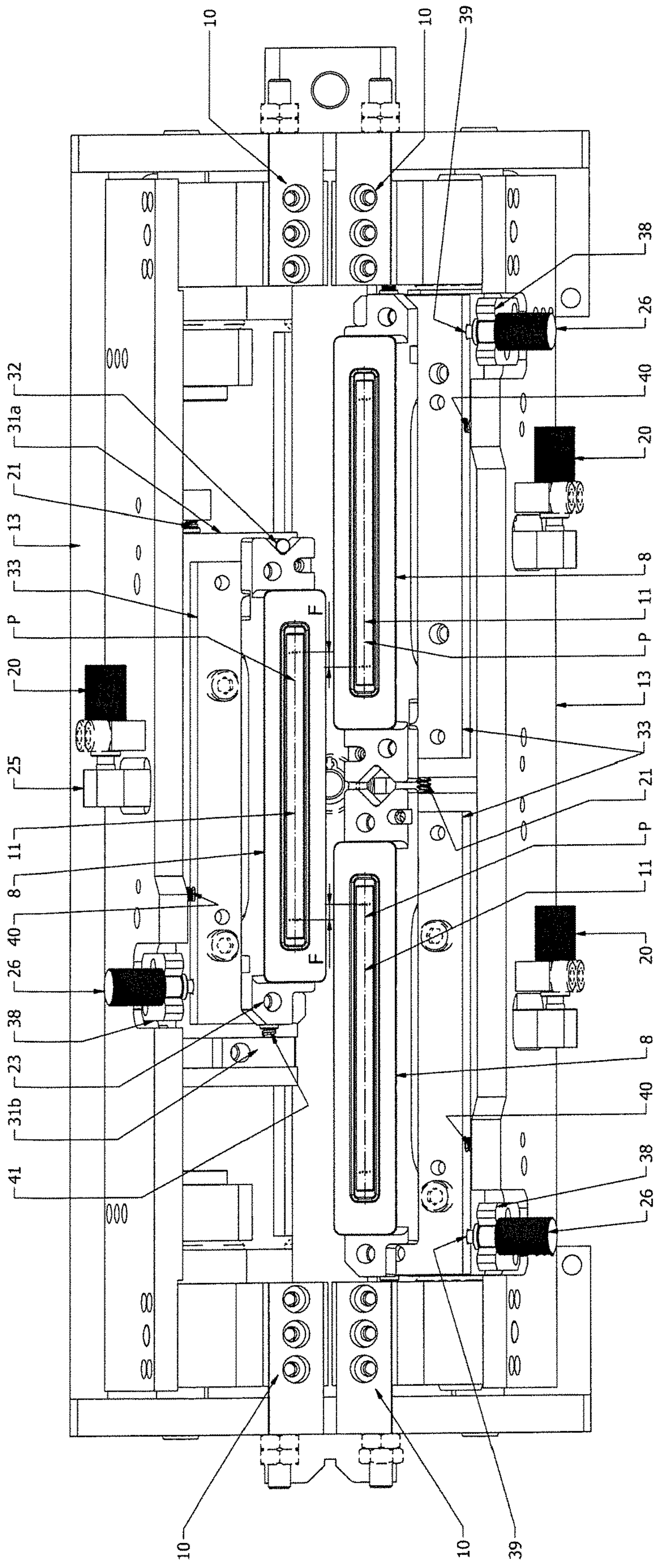
FIG. 2 shows a plan view from below of a printing station.
Figure 3:
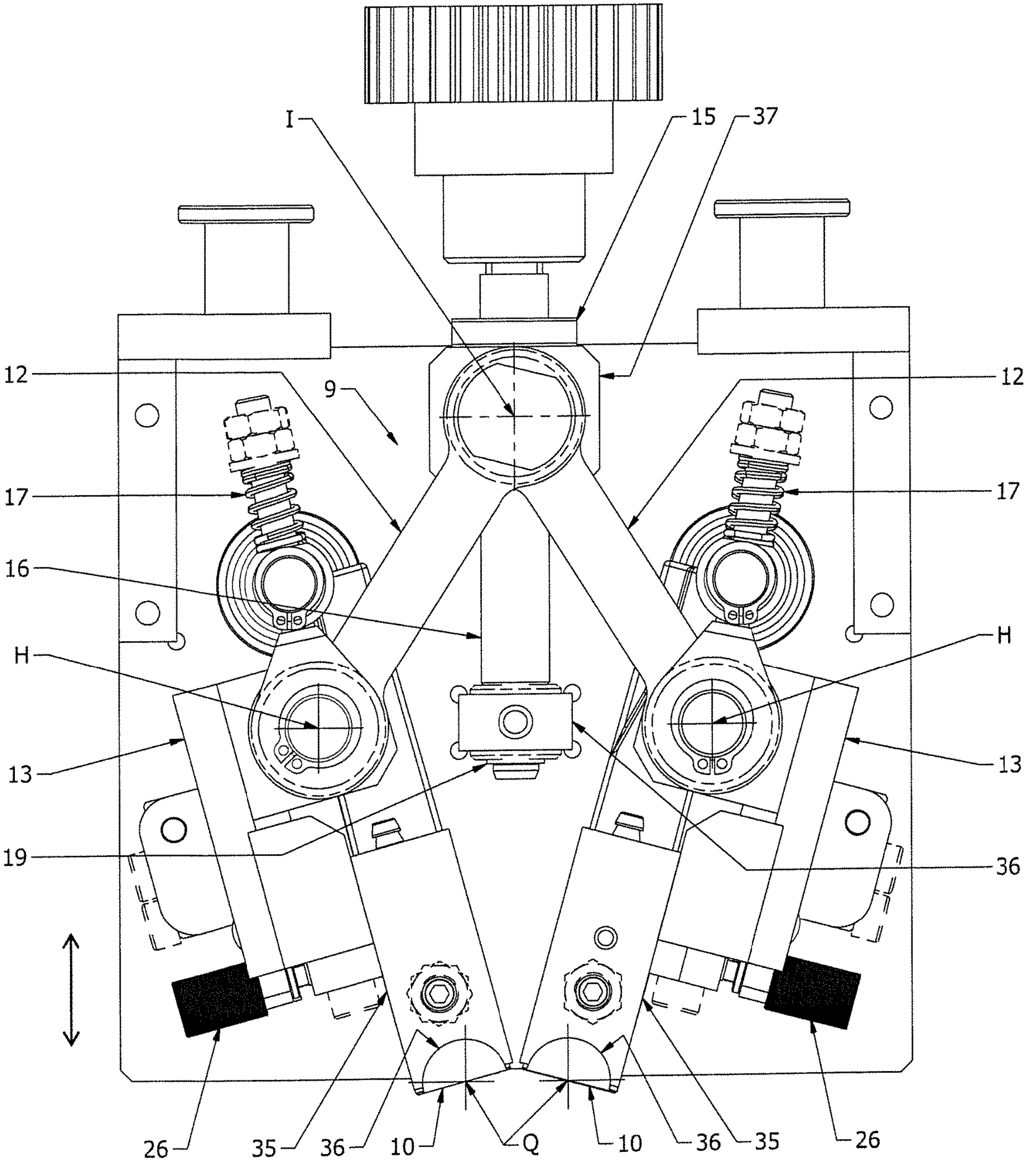
FIG. 3 shows a view of a printing station in the radial direction with respect to the rotation axis of the table.
Figure 4:
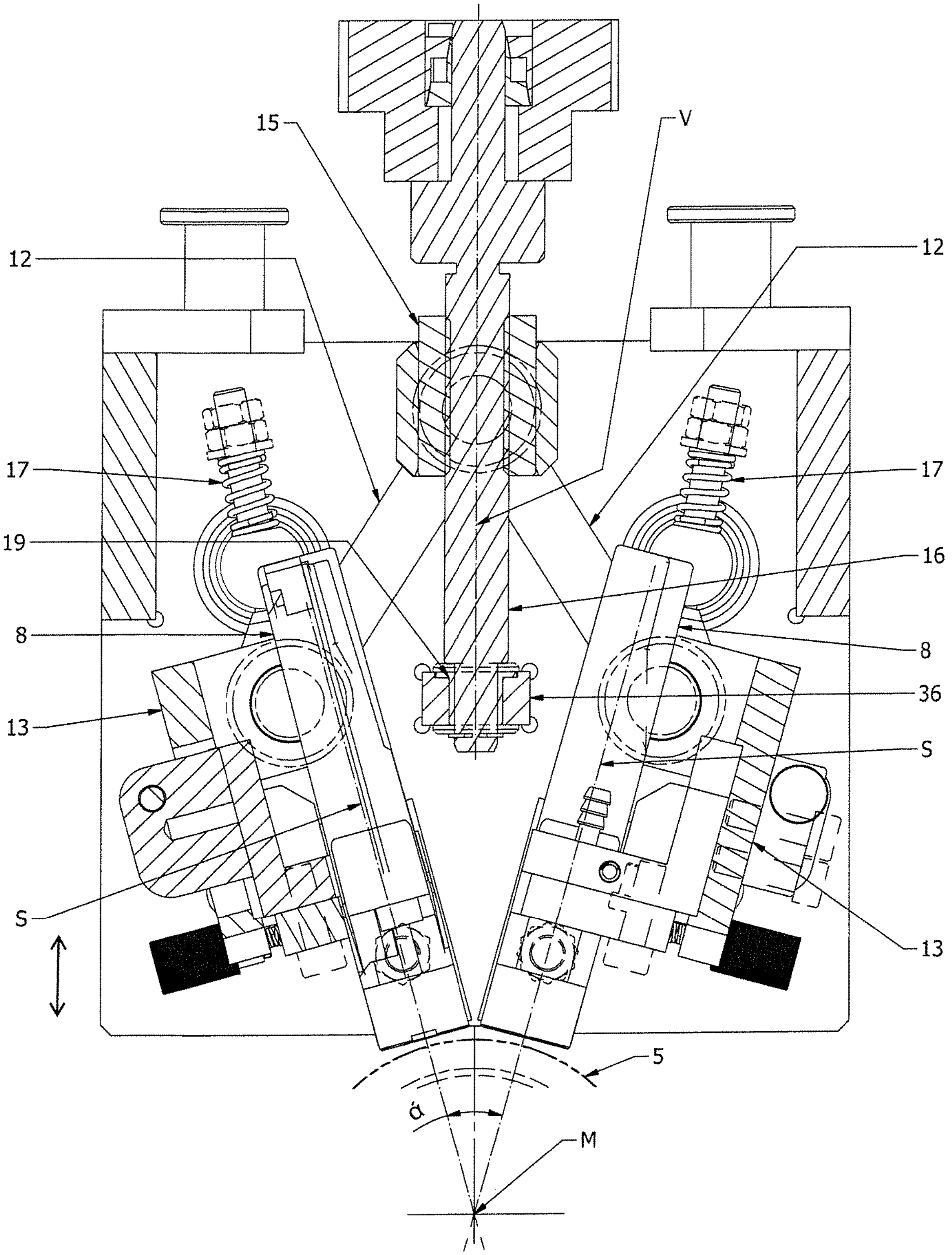
FIG. 4 shows the same view as FIG. 3 but in vertical section, where the axial generatrices of the printing substrate have been added in a schematic manner.
Figure 5:
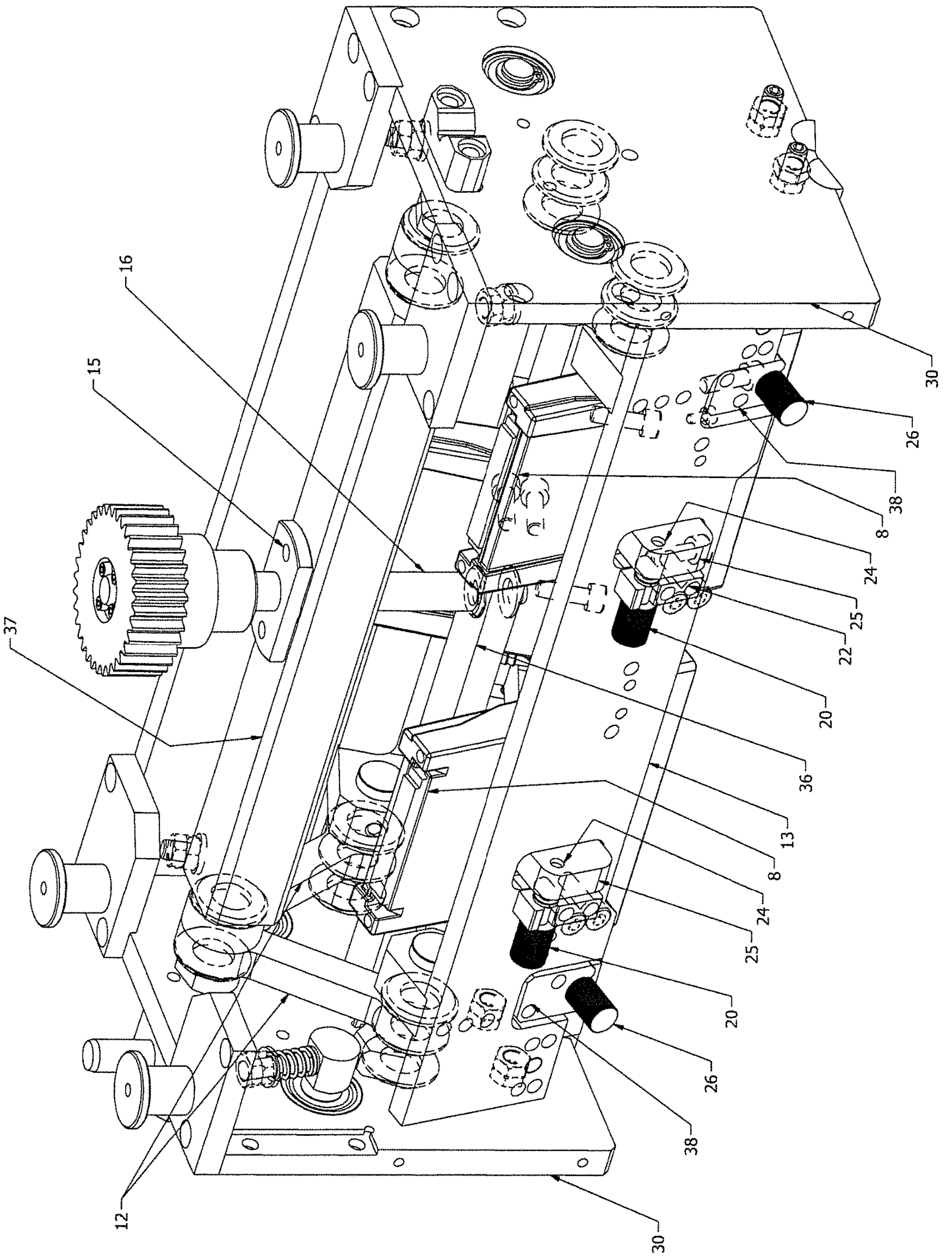
FIG. 5 shows an axonometric view of the printing station.
Figure 6:
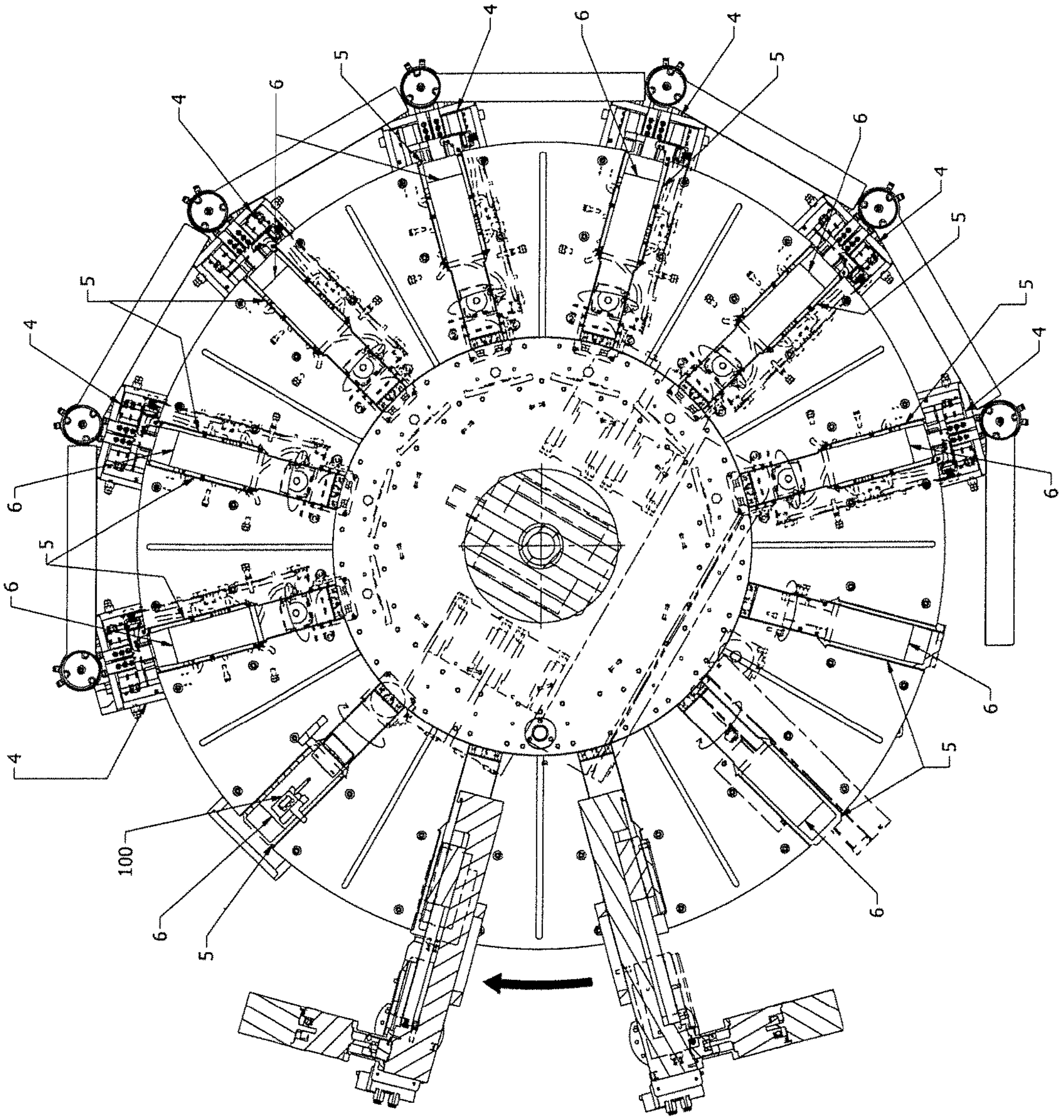
FIG. 6 shows a plan view from below of the printing machine.
Figure 7:
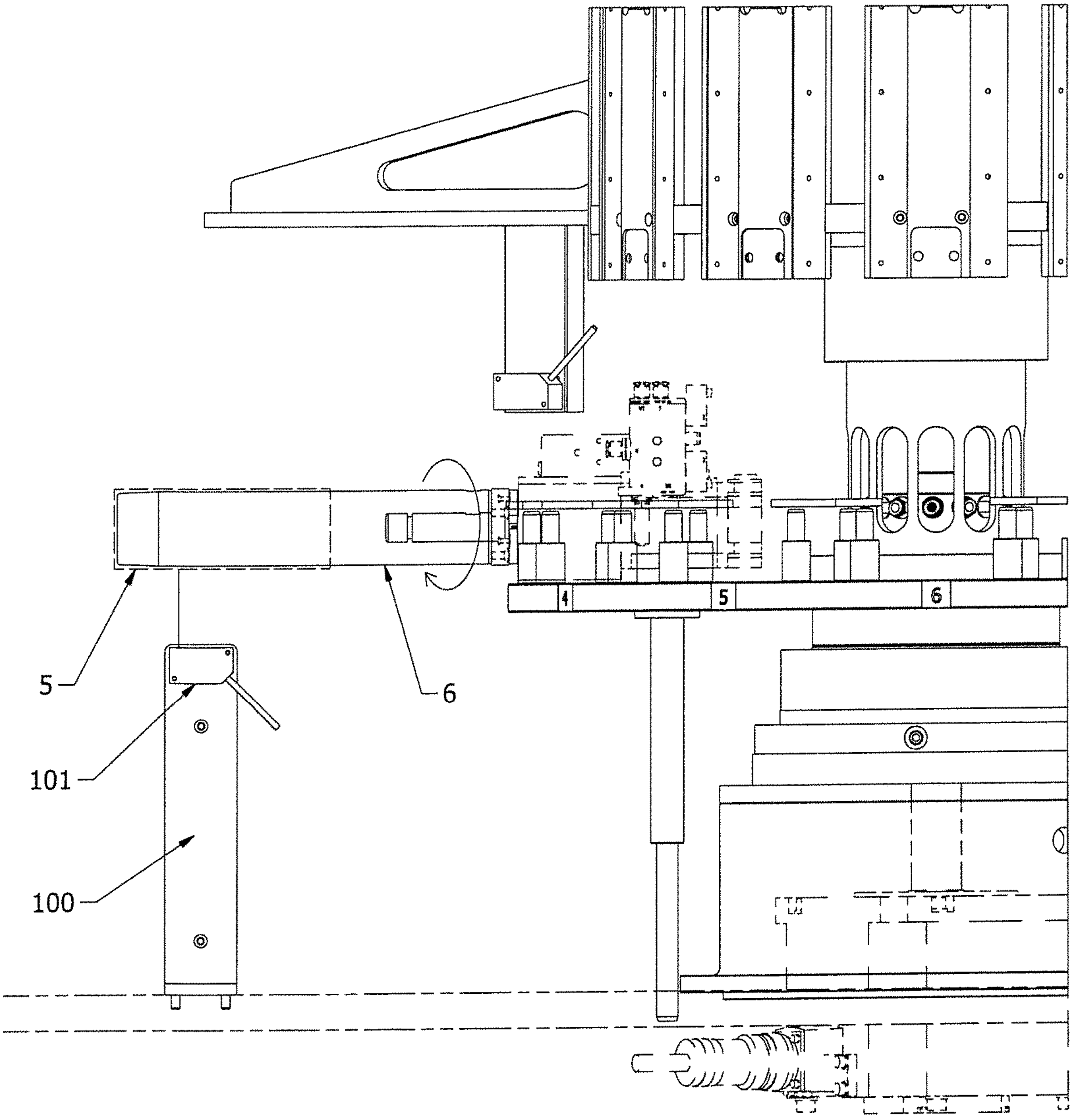
FIG. 7 shows a side elevation view of the eccentricity profile detection station.
Figure 8:
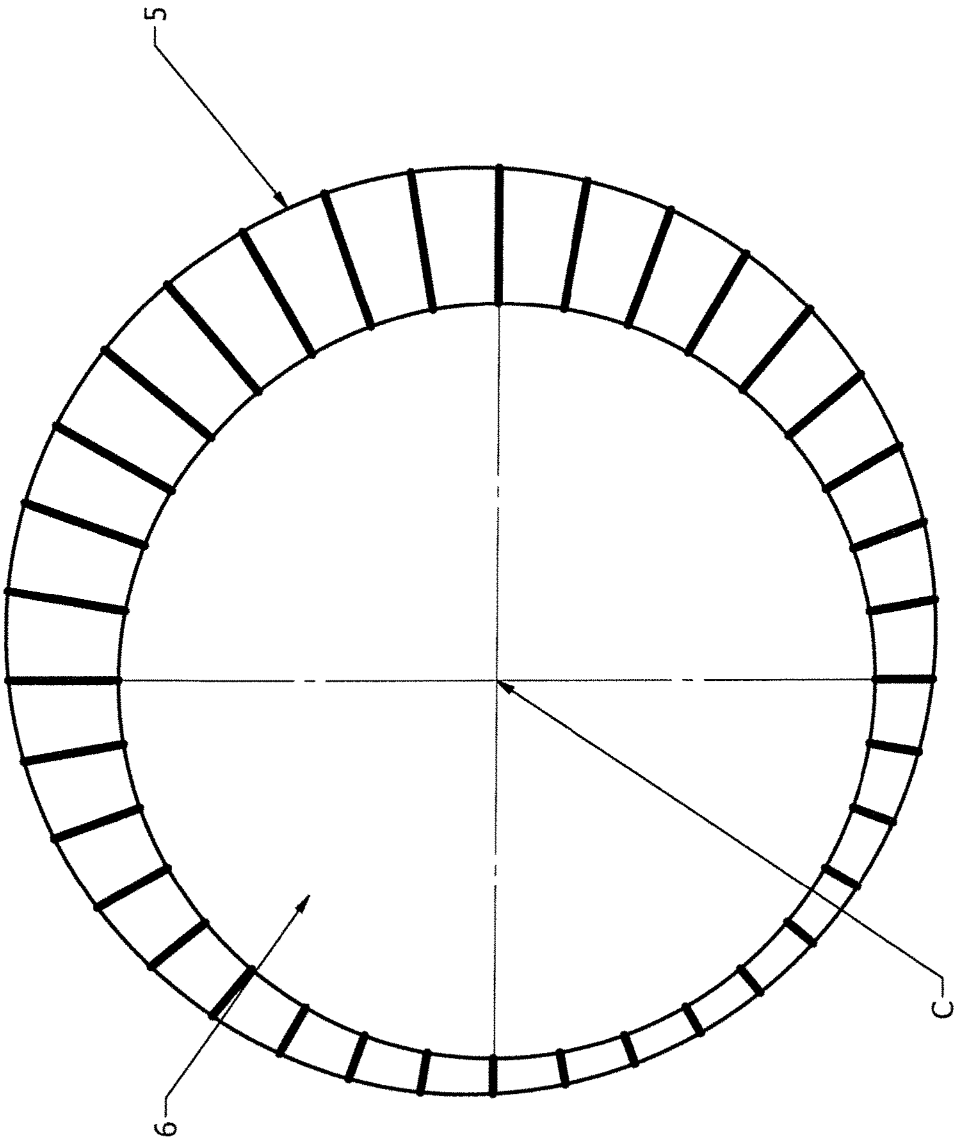
FIG. 8 shows an eccentricity profile of a container locked on the spindle.
Figure 9:
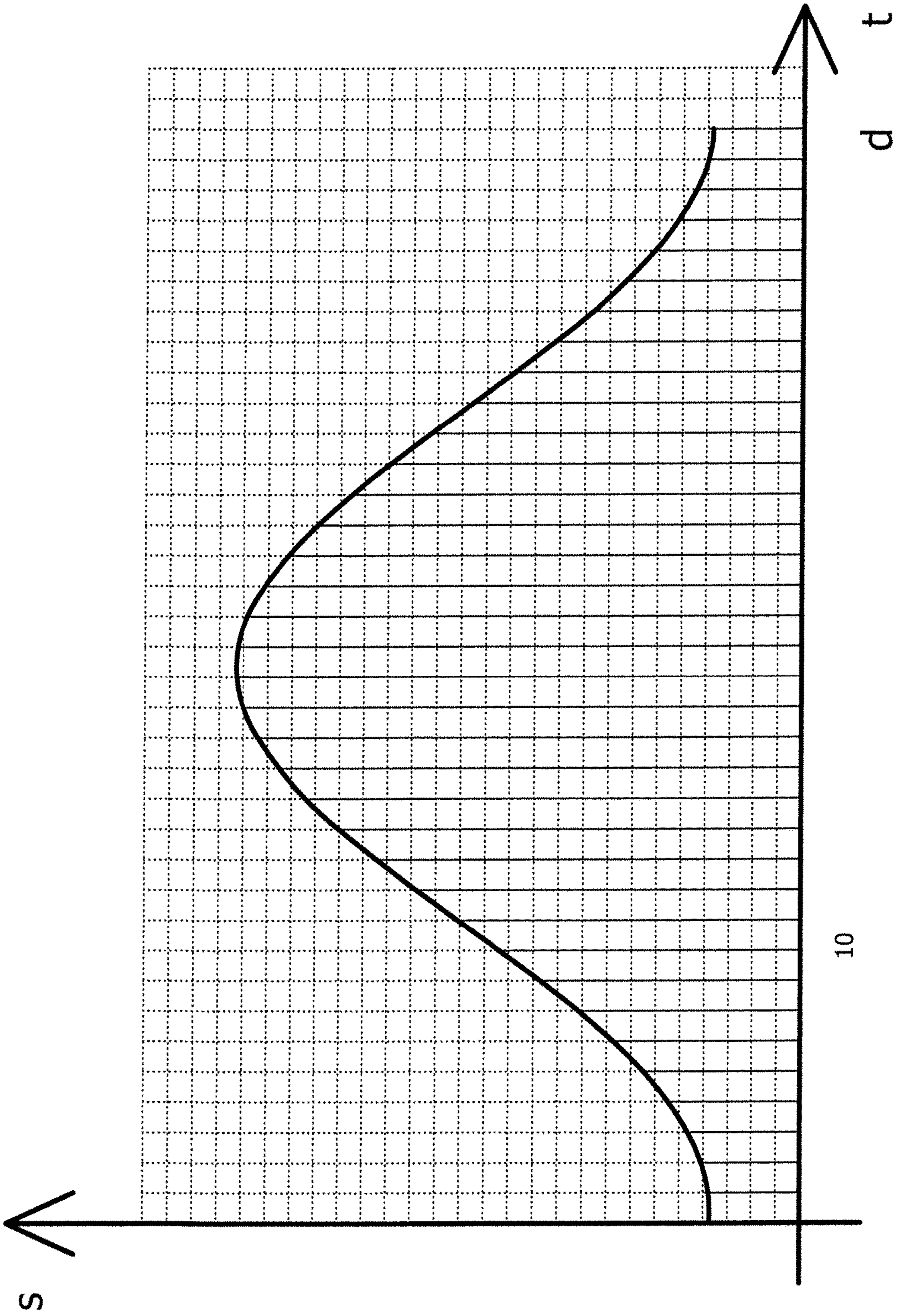
FIG. 9 shows the hourly motion law of the plasma emitting modules of the pretreatment station and the printing heads of the printing station.

Equivalent parts are indicated in the various embodiments using the same reference number. With reference to the figures mentioned, a pretreatment device 102 positioned in a pretreatment station 103 is shown.

The device 102 is designed for pretreating at least one container 5 with a longitudinal axis C, in particular a container 5 with rotational symmetry around said longitudinal axis C, having an outer surface to be subjected to printing with an inkjet digital printing machine 1.

The container 5 can be intended for various purposes, e.g., a food can or a can for deodorant sprays, for detergents, etc.

Advantageously, the pretreatment device 102 comprises a frame that supports the plasma emitting means for irradiating the outer surface of the container 5.

The pretreatment device 102 also comprises a table 2 that is rotatable around an axis L and supporting at least one support spindle 6 supporting the container 5.

For the reasons that will be clearer below, the table 2 supports a plurality of spindles 6 that are distributed at a constant angular pitch.

The table 2 preferably has a vertical rotation axis L.

The spindle 6 can be activated in rotation on its own axis M and rigidly supports the container 5 in rotation.

In the illustrated case where the container 5 is perfectly symmetrical and centered on the spindle 6, the axes C and M coincide.

The spindle 6 has an axis M oriented radially with respect to the rotation axis L of the table 2. The table 2 is configured to carry and park the spindle 6 at an exposure position in which the outer surface of the container 5 is exposed to the plasma.

Advantageously in the exposure position the spindle 6 can be activated in rotation around its own axis M for the progressive exposure of the outer surface of the container 5 to the plasma. Advantageously, the plasma emitting means is modular composable.

In particular, the emitting means comprises first plasma emitting modules 105*i*, 105*ii* arranged at a first angular position around the axis of the spindle 6 parked in the exposure position.

The first modules 105*i*, 105*ii* are aligned to irradiate an axial sector of the outer surface of the container 5.

In practice, the first adjacent emitting modules 105*i*, 105*ii* irradiate adjacent and partially overlapped areas of the axial sector of the outer surface of the container 5.

As a result of the rotation of the spindle 6 around its own axis M, contiguous axial sectors of the outer surface of the container 5 are exposed to the plasma, and upon completion of a rotation of the spindle 6 by 360° around its own axis Mall the outer surface of the container 5 is exposed to the plasma irradiated by the first emitting modules 105*i*, 105*ii*.

The frame individually supports the first modules 105*i*, 105*ii* that can be removed and repositioned at will independently of each other.

The device 102 provides for variation means for varying the emission direction of the first modules 105*i*, 105*ii*.

The variation means for varying the emission direction comprises pins 106 with which the first modules 105*i*, 105*ii* are hinged to the frame.

The hinge pins 106 are parallel to one another and orthogonal to the axis M of the spindle 6 parked in the exposure position.

The first modules 105*i*, 105*ii* can be locked, by means of special locking means, not shown, in a range of angular positions around the respective hinge pins 106.

In practice, the orientation of each of the first emitting modules 105*i*, 105*ii* can be set in such a way that the angle of incidence 8 of the plasma is substantially orthogonal to the corresponding irradiated area of the axial sector of the outer surface of the container 5.

If the axial sector of the outer surface of the container 5 exposed to the plasma is entirely cylindrical, all the first modules 105*i*, 105*ii* will have an emission surface with the same orientation; if, on the other hand, areas of the axial sector of the outer surface of the container 5 exposed to the plasma lie differently, then correspondingly also the first modules 105*i*, 105*ii* have an emission surface with different orientation to maintain the substantial orthogonality of the angle of incidence of the plasma.

Figure 10:
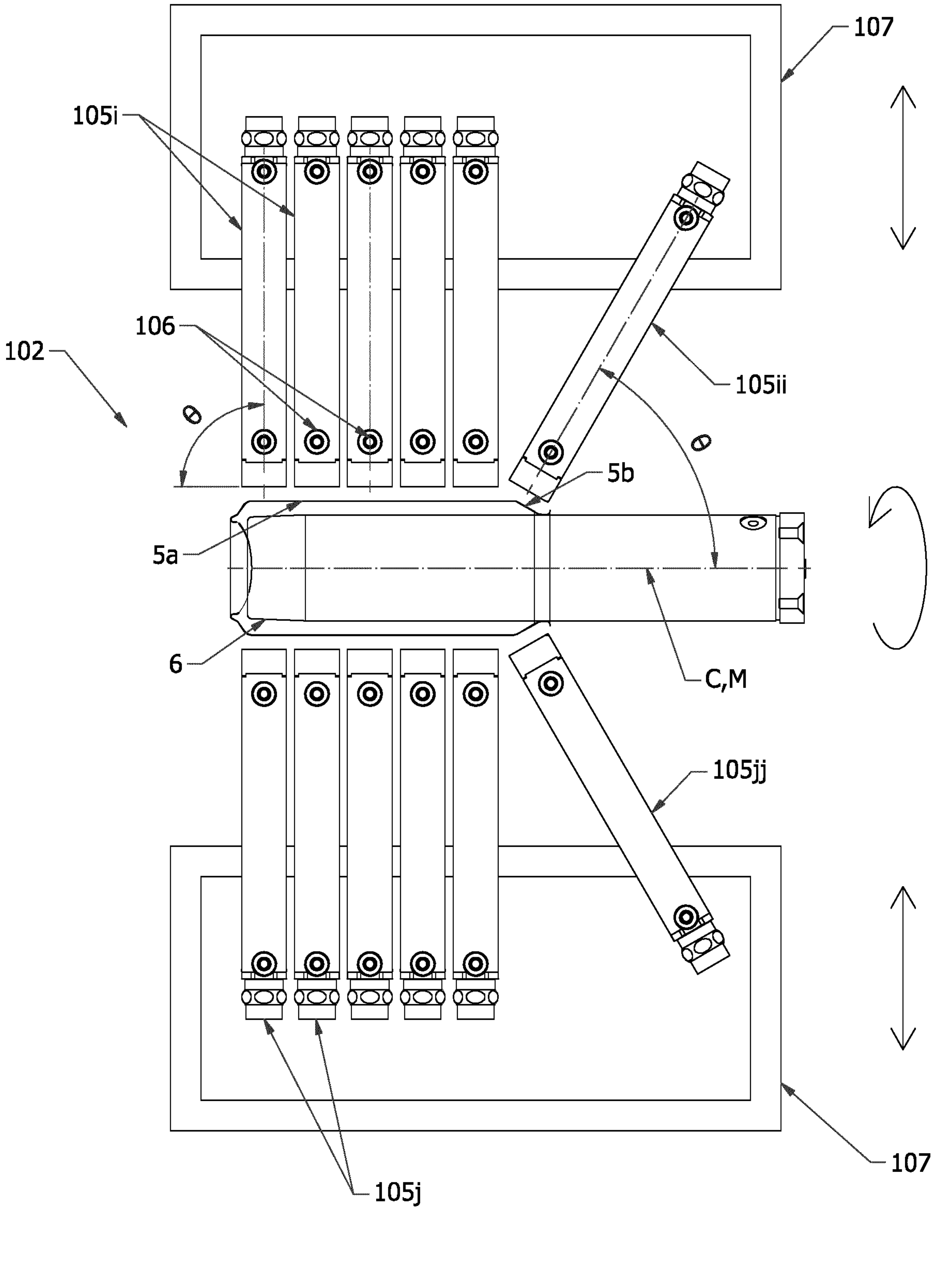
FIG. 10 shows a side elevation view of the device present in the pretreatment station in a first configuration of the modular composable plasma emitting means.
Figure 11:
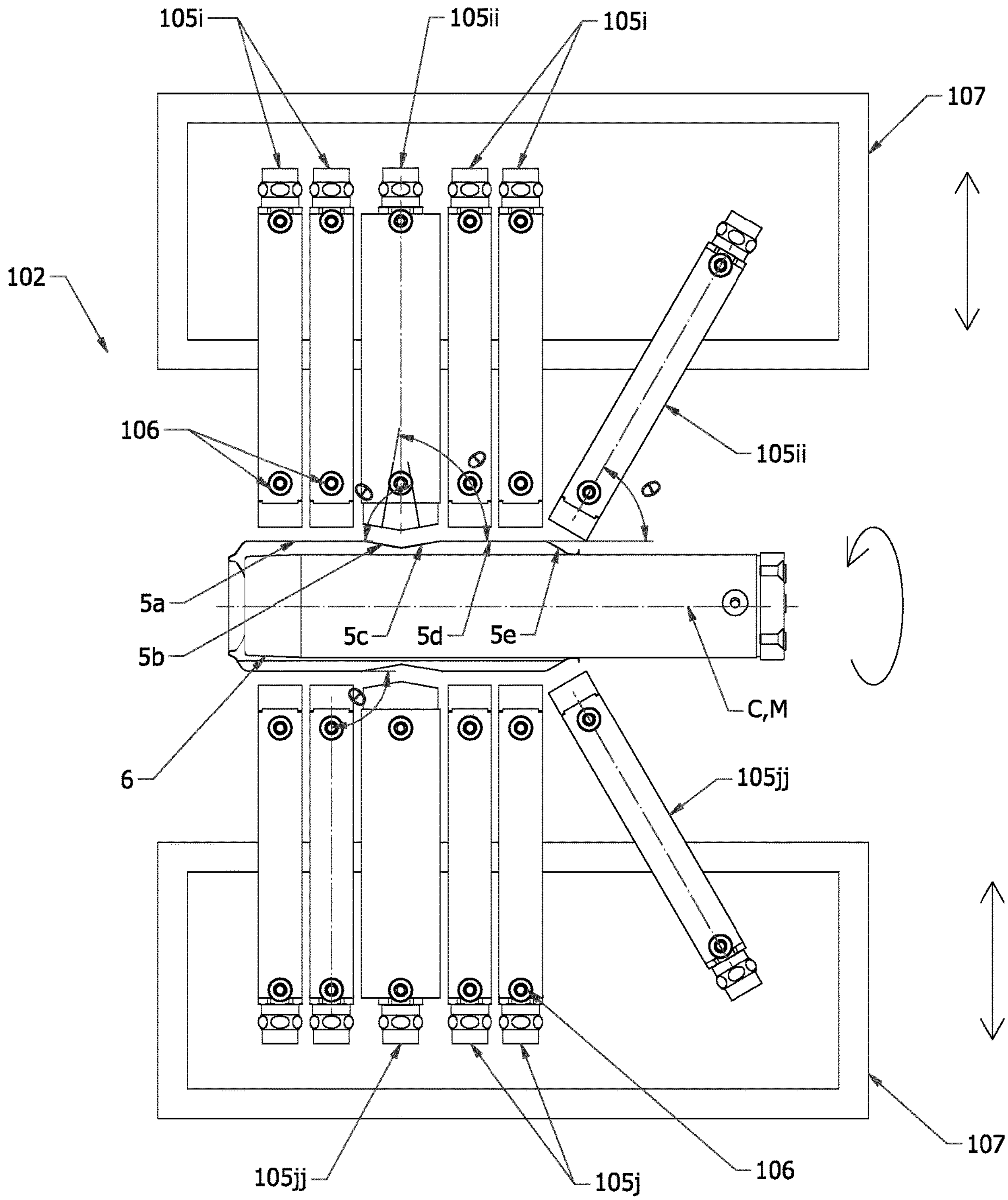
FIG. 11 shows a side elevation view of the device present in the pretreatment station in a second configuration of the modular composable plasma emitting means.
Figure 12:
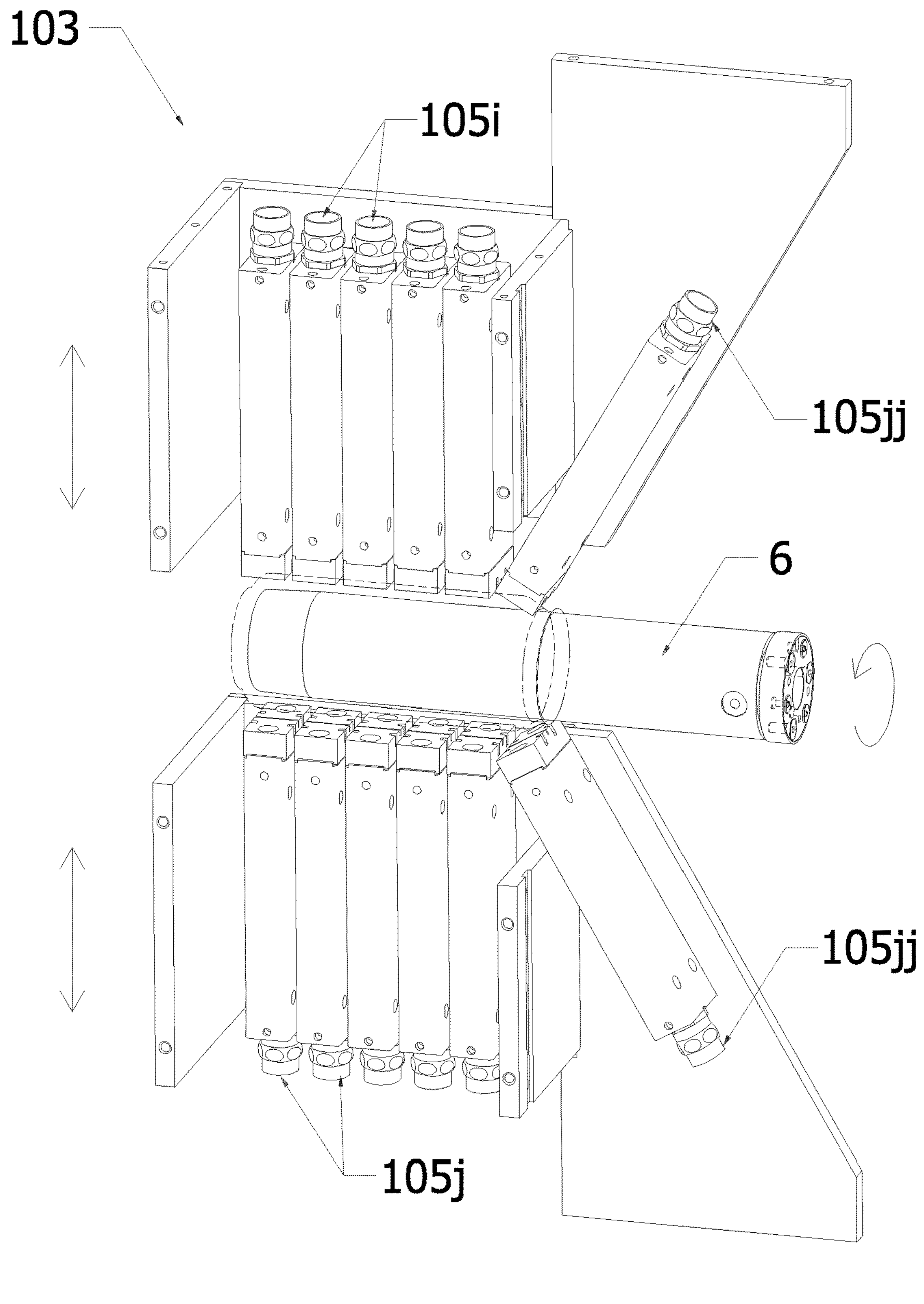
FIG. 12 shows an axonometric view of the pretreatment station.

This concept is well exemplified in FIGS. 10 and 11.

In FIG. 10 the irradiated axial sector of the outer surface of the container 5 comprises a first area of cylindrical sector 5*a* and a second area of truncated conical sector 5*b* that is converging towards the axis C of the container 5.

The first modules 105*i* that irradiate the first area of the cylindrical sector 5*a* have an emission surface with the same orientation while the first module 105*ii* that irradiates the second area of truncated conical sector 5*b* has an emission surface with a different orientation from that of all the other first modules 105*i*.

In FIG. 11, the axial sector of the outer surface of the container 5 comprises a first area of cylindrical sector 5*a*, a second area of truncated conical sector 5*b* that is converging towards the axis C of the container 5, a third area of truncated conical sector 5*c* that is diverging from the axis C of the container 5, a fourth area of cylindrical sector 5*d* and a fifth area of truncated conical sector 5*e* that is converging towards the axis C of the container.

The first modules 105*i* that irradiate the first area of cylindrical sector 5*a* and the third area of cylindrical sector 5*d* have an emission surface with the same orientation while the first modules 105*ii* that irradiate the various zones of truncated conical sector 5*b*, 5*c*, 5*e* have an emission surface with a different orientation.

Preferably the device 102 also provides for a special variation means for varying the radial distance of the first emitting modules 105*i*, 105*ii* from the axis of the spindle 6 parked in the exposure position.

The variation means for varying the radial distance of the first emitting modules 105*i*, 105*ii* serves to be able to maintain the distance of the first emitting modules 105*i*, 105*ii* from the outer surface of the container 5 unaltered when the format of the container 5 itself varies.

The variation means for varying the radial distance of the first emitting modules 105*i*, 105*ii* comprises, for example, a translatable bar 107 for the collective support of the first emitting modules 105*i*, 105*ii*.

The frame therefore supports the translatable bar 107 from which individually the first modules 105*i*, 105*ii* can be removed and repositioned at will independently of each other.

In order to improve the flexibility of the radial adjustment, it can also be provided that the hinge pins 106 are individually supported by corresponding blocks that are in turn adjustable in position in sliding seats provided in the translatable bar 107.

Preferably, as illustrated, one or more second plasma emitting modules 105*j*, 105*jj* are provided which are arranged at a second angular position around the axis of the spindle 6 parked in the exposure position.

Preferably the first emitting modules 105*i*, 105*ii* are in a position diametrically opposite the second emitting modules 105*j*, 105*jj* with respect to the axis M of the spindle 6.

The second modules 105*j*, 105*jj* are aligned to irradiate an axial sector of the outer surface of the container 5 that is diametrically opposite to that irradiated by the first emitting modules 105*i*, 105*ii*.

The frame individually supports the second modules 105*j*, 105*jj* that can be removed and repositioned at will independently of each other.

The device 102 also envisages for the second modules 105*j*, 105*jj* a variation means for varying the emission direction that is similar to that provided for the first modules 105*i*, 105*ii*, in particular pins 106 with which the second modules 105*j*, 105*jj* are hinged to the frame.

The device 102 also envisages for the second modules 105*j*, 105*jj* a variation means for varying their radial distance from the axis of the spindle 6 parked in the exposure position that is similar to that provided for the first modules 105*i*, 105*ii*, in particular a translatable bar 107 for the collective support of the second emitting modules 105*j*, 105*jj*.

As can be seen from the examples, in the case of a solid with non-cylindrical rotational symmetry, in order to maintain the orthogonality of incidence of the plasma beam it may be necessary to tilt one or more first emitting modules or adopt a shaped emission surface (as in the case of the modules 105*ii* of FIG. 11). In some cases, in order to avoid mechanical interference between two adjacent first emitting modules at different inclination, it is possible to eliminate one of these first two emitting modules and to provide in a diametrically opposite position with respect to the axis M of the spindle 6 for a second emitting module intended to irradiate the same section of axial sector to which the first removed emitting module would have been intended.

With the architecture of the first embodiment of FIG. 10 it is possible to irradiate entirely in one turn of the spindle 6 twice both the cylindrical part and the shoulder of the container 5 simply by varying the inclination of the head modules, whereas with the architecture of the second embodiment of FIG. 11 it is possible to irradiate entirely in one turn of the spindle 6 twice both the cylindrical parts and the truncated conical parts of the container 5 by providing for special modules with a shaped emission surface, such as an emission surface that has two sections that are tilted specularly with respect to the axis of the modules.

In certain applications, if for example it is wished to intensify the pretreatment selectively at a shoulder of a beverage can, compared to the architecture illustrated in FIG. 10 it is enough to deactivate (or remove) the second modules 105*j* that are orthogonal to the axis M of the spindle and leave active only the modules with an emission surface inclined with respect to the axis M of the spindle 6.

Figure 13:
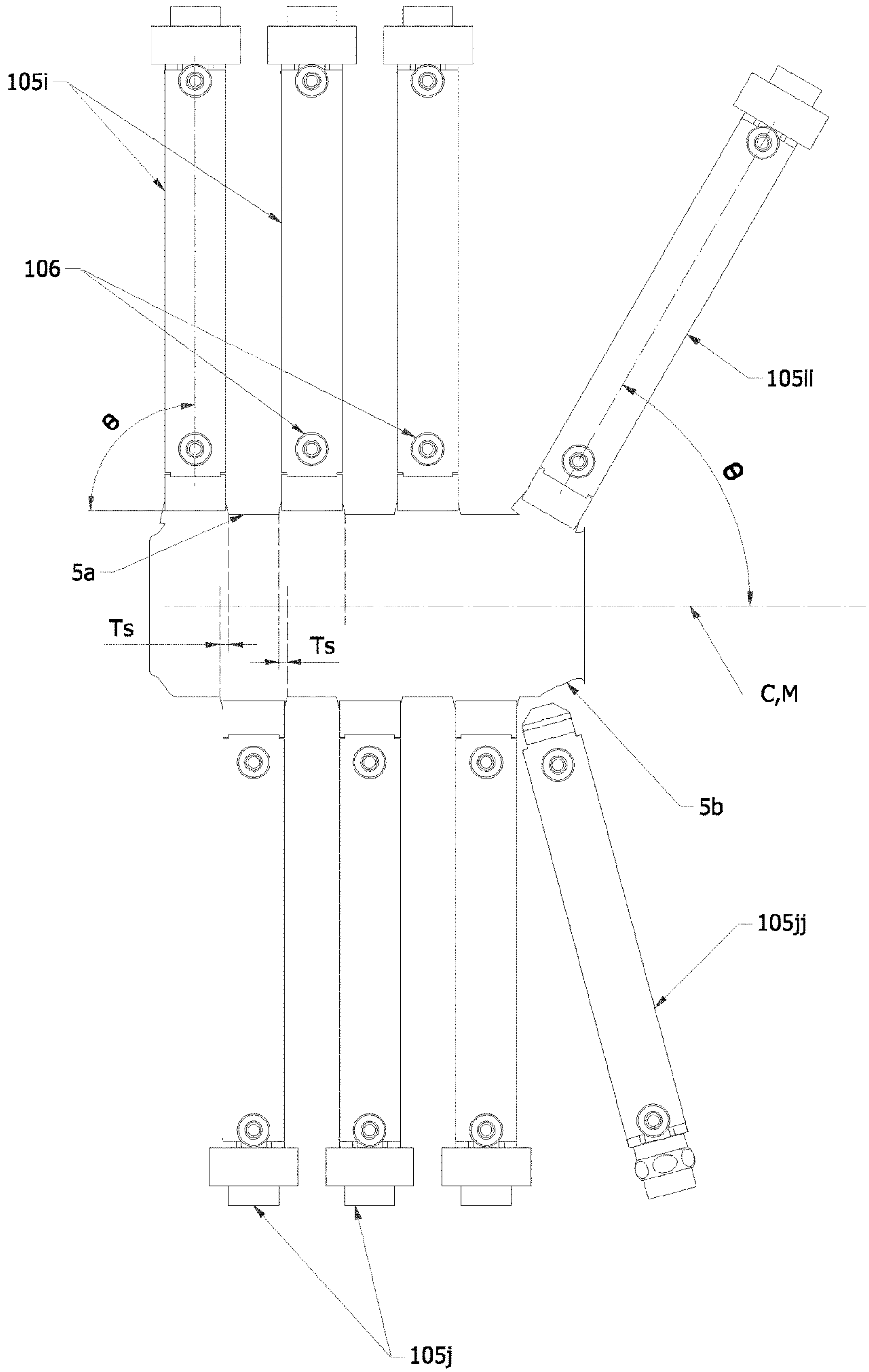
FIG. 13 shows a side elevation view of the device present in the pretreatment station in a further configuration of the modular composable plasma emitting means.

FIG. 13 shows a variant in which the consecutive plasma emitting modules 105*i*, 105*j* in the direction of the axis M of the spindle 6 have a section of overlap Ts in the direction of the axis M of the spindle 6.

In this way, no areas of the container 5 remain without plasma treatment as the consecutive modules 105*i*, 105*j* in their overlapping section TS irradiate the same axial section of the container 5: the surface of the container 5, being uniformly treated with the plasma, therefore reacts uniformly to the subsequent deposition of the ink that has uniform color and uniform adhesion on the uniformly treated plasma surface.

In the case illustrated, the consecutive modules 105*i*, 105*j* in the direction of the axis M of the spindle 6 are on diametrically opposite sides of the spindle 6, but in solutions not shown they can be positioned on the same side of the spindle 6.

The pretreatment station 103 is integrated into an inkjet digital machine 1.

The ink jet digital machine 1 comprises a printing unit 3 comprising one or preferably more printing stations 4 extending longitudinally and are each provided with one or preferably more printing heads 8.

The printing heads 8 have a maim lying plane S which, in the case of a substantially parallelepiped shape, corresponds to the center plane parallel to the two lateral longitudinal surfaces.

In a printing head 8 of this shape, the lower longitudinal surface is provided with one or more parallel longitudinal rows of firing nozzles.

The table 2 is configured to sequentially carry and park the spindle 6 at the printing stations 4 where the spindle 6 can be activated in rotation on its own axis M.

The spindle 6 parked at a printing station has its axis M parallel and equidistant from the longitudinal axis P of the printing heads 8.

The table 2 is configured to carry and park the spindle 6 at the pretreatment station 103 before carrying and parking the spindle 6 at the printing stations.

The pretreatment station 102 and the printing stations 4 are therefore positioned along the circular trajectory of the spindles 6 above the rotary table 2 at an angular spacing pitch defined around the rotation axis L of the table 2, in particular equal to or a multiple of the angular spacing pitch of the spindles 6.

The digital printing machine 1 envisages servo-assisted motorizations for a bidirectional linear movement of the plasma emitting means and respectively of the printing heads 8 of each printing station 4 in a direction parallel to the rotation axis L of the table 2.

The servo-assisted motorization for the bidirectional linear movement of the plasma emitting means in particular can activate the bars 107 in a synchronized manner.

Advantageously, moreover, the printing machine 1 includes a detection station 100 for detecting the eccentricity profile of the containers 5 which is positioned upstream of the pretreatment station 102.

The detection station 100 includes distance sensor means of the containers locked on the respective spindles 6 rotating on themselves.

The detection station 100 further includes an actuation controller for actuating the servo-assisted motorizations present in the pretreatment station 102 and in each printing station 4.

The controller is configured to activate the servo-assisted motorizations, during the rotation of the spindle 6 on itself at the pretreatment station 102 and of the printing stations 4, with an hourly law s=s(t) univocally determined by the detected eccentricity profile.

The hourly law s=s(t) is defined starting from the detected eccentricity profile so as to maintain the distance of the plasma emitting modules and of the printing heads 8 from the container 5 in the pretreatment station 102 and respectively in each printing station 4 constant.

The sensor means 101 comprises one or more non-contact distance sensors, for example optical sensors.

The distance sensors 101 are mounted in a fixed position in the detection station 100 and are oriented orthogonally to the axis M of the spindle 6.

In a 360° turn of the spindle 6 on itself, the sensors 101 acquire an eccentricity profile of the container 5 locked on the spindle 6.

The sensor means detects, during the rotation of the container 5, its eccentricity through the measurement of the mutual distance, acquiring a series of points along the outer peripheral profile of the container 5.

In practice, the electronic controller acquires the distance measurements and constructs an eccentricity curve of the piece with which it elaborates the hourly law s=s(t). Such a curve is sent to the driver of the motorizations which move the plasma emitting modules and the printing heads 8.

The motorizations generate the movement according to the hourly law s=s(t) so that the distance between the emitting modules and the container 5 and respectively between the printing heads 8 and the container 5 is constant during the rotation on itself of the container 5 at the pretreatment station 102 and respectively of each printing station 4.

The plasma emitting modules and the printing heads 8 of the subsequent printing stations are moved in sequence according to the same hourly law during the parking of the same container 5. In fact, once the container 5 is locked by the spindle 6, it retains its eccentricity position and the angular position for its entire stay inside the printing machine 1.

The machine 1 provides in particular for an initial setting of the plasma emitting means and of the printing heads 8 of the printing station 4.

The machine 1 provides in particular for an initial setting of the initial distance of the emitting modules from the axis M of the spindle 6 and for an initial setting of the initial distance d between the axis M of the spindle 6 and the printing heads 8 of the printing stations 4 and of the orientation of the main lying planes S of the printing heads 8.

The initial setting depends on the format of the containers 5 to be printed.

With the initial setting, the printing heads 8 are inclined so that the axis M of the spindle 6 parked at the printing station 4 belongs to the center plane S of the printing heads 8.

The longitudinal dimension of the printing station 4 must be such that it fits the axial length of the cylindrical printing substrates 5.

For this reason, although the solution shown merely by way of example includes three printing heads 8 per printing station 4, the number of printing heads 8 per printing station 4 can vary.

If the printing stations 4 envisage multiple printing heads 8, these must have a section F of overlap in the direction of their longitudinal axis P.

In order to ensure the partial overlap and at the same time the requested inclination of their main lying plane S, the adjacent printing heads 8 have an offset angle a of their main lying plane S with respect to the axis M of the spindle 6.

Thus, two rows of printing heads 8 are delineated, where the printing heads 8 of each row share the main lying plane S.

The printing station 4 has a frame 30, 36 for supporting the two rows of printing heads 8. Each row of printing heads 8 is supported by a corresponding support structure 13, 23, 31.

Each support structure 13, 23, 31 comprises a longitudinal plate 13 and, for each printing head 8, an angular support 31*a*, 31*b* in turn supporting a cradle 23 for housing the printing head 8.

Each angular support 31*a*, 31*b* is independently supported by the longitudinal plate 13 in a linearly adjustable position along the longitudinal plate 13 itself.

Each angular support 31*a*, 31*b* in turn supports the cradle 23, and the printing head 8 fixed therein, in an angularly adjustable position about a pin 32.

Each angular support 31*a*, 31*b* has a base 31*a* and a shoulder 31*b*.

More precisely, the cradle 23 is fixed to a base 33 resting against the base 31*a* of the angular support 31*a*, 31*b*.

The means for setting the orientation of the printing heads 8 comprises a toggle system 9.

The toggle system 9 can be activated to impose a coordinated rotation of the two rows of printing heads 8 about a respective pivot 10.

For each row of printing heads 8, the corresponding pivot 10 is positioned at the lower end 11 of the printing heads 8 and defines a rotation axis Q parallel to the axis M of the spindle 6.

On the pivots 10, consisting of pins with a crescent-shaped cross-section, end blocks 36 of the longitudinal plates 13 are engaged.

In particular, the end blocks 36 have special engagement seats 36 conjugated to the pivots 10 on their peripheral edge.

The toggle system 9 has symmetrical connecting rods 12 each of which has its lower end hinged to the longitudinal plate 13 of a corresponding support structure 13, 23, 31*a*, 31*b*.

The upper end of each connecting rod 12 is instead operatively connected to a screw nut 15 engaged so as to slide along a screw 16 having a vertical axis V which intercepts the axis M of the spindle 6.

More precisely, a longitudinal bar 37, which has hinges to the connecting rods 12 at the opposite ends, is centrally fixed to the screw nut 15.

The lower H and upper I hinge axes of the connecting rods 12 are in turn parallel to the axis M of the spindle 6.

The screw 16 is supported in a special housing 19 fixed to a longitudinal bar 36 of the frame 30, 36.

In practice, the screw 16 can rotate on itself without translating in order to drag the screw nut 15 upwards and downwards and thus activate the toggle 9.

Elastic pushing means is provided to maintain the rotation of the two rows of printing heads 8 around their respective pivots 10 when the toggle 9 is activated.

The elastic pushing means comprises symmetrical springs 17 configured and arranged to exert a thrust in an oblique downwards direction at the lower hinges of the connecting rods 12.

Each printing station 4 further comprises a fine adjustment means for adjusting the mutual position of the printing heads 8.

The fine adjustment means comprises the first fine adjustment means of the section of overlap F between the printing heads 8.

The first fine adjustment means comprises, for each printing head 8, a micrometric screw 20 counteracted by a spring 21 for eliminating the clearance of the thread of the micrometric screw 20.

The micrometric screw 20 is supported in a housing 22 fixed to the longitudinal plate 13 and engages a threaded hole 24 present in a flange 25 fixed to the base 31*a* of the angular plate 31*a*, 31*b*.

For the adjustment, the angular plate 31*a*, 31*b* and therewith the cradle 23 housing the printing head 8 are moved along the longitudinal plate 13 by activating the micrometric screw 20.

The fine adjustment means further comprises a second fine adjustment means for adjusting the mutual alignment between the longitudinal axes P of the printing heads 8.

Also in this case, the second adjustment means comprises, for each printing head 8, a micrometric screw 26 counteracted by a spring 40 for eliminating the clearance of the thread of the micrometric screw 26.

The micrometric screw 26 is supported in a housing 38 fixed to the base 31*a* of the angular plate 31*a*, 31*b* and engages a threaded hole 39 present in the base 33 of the cradle 23.

The micrometric screw 26 rotates the cradle 23 about the pin 32 and the rotation of the cradle 23 is counteracted by a spring 41 supported by the shoulder 31*b* of the angular support 31*a*, 31*b* and resting against the cradle 23.

The spring 41 slides on the cradle 23 allowing the latter to rotate but remains under tension so as to block the angle of rotation achieved by the cradle 23 following the activation of the micrometric screw 26.

Each printing station 4 is arranged to dispense ink in a single color.

The printing process takes place as follows.

Before the printing process is started, the initial settings related to the format of the containers 5 to be printed are performed.

In particular, depending on the format of the containers 5, in the pretreatment station 103 a certain distribution of first and second plasma emitting modules is selected, their linear initial position is set, for example by adjusting the initial position of the bars 107, and the angle of the emitting modules around the pins 106 is set.

The linear and angular position of the printing heads 8 is set also in the printing stations 4.

In particular, the toggle 9 is activated at each printing station 4 to reorient the lying planes S of the printing heads 8 so that the printing can be carried out substantially with the condition of belonging of the axis of the container 5 to the main lying plane S of the printing heads 8.

Before the printing process is started, the printing heads 8 of each printing station 4 are also adjusted by means of the micrometric screws 20, 26 which adjust the section of overlap F between the printing heads 8 and respectively the alignment of their longitudinal axis P in a direction parallel to the axis M of the spindle 6.

In particular, the section of overlap F must be such that it overlaps one or more of the firing nozzles included in the adjacent printing heads 8.

Once the preliminary adjustments have been completed, the table 2 is activated, to whose spindles 6 the containers 5 are supplied by a loader not illustrated.

The table 2 is activated in step-by-step rotation, and at each advancement step it sequentially positions each first container 5 firstly below the detection station 100, then below the pretreatment station 103 and finally below the subsequent printing stations 4.

At each stop of the table 2, the spindles 6 are rotated on their axis M.

During the rotation of the container 5 below the detection station 100, its eccentricity profile is acquired which will be processed by the electronic controller to establish the hourly motion law s=s(t) to be performed by the plasma emitting modules and the printing heads 8 to maintain their distance from the container 5 constant.

An ink is dispensed at each printing station 4 with a single passage with the printing heads 8 moving according to the hourly motion law s=s(t) in a manner synchronized with the rotation on itself of the container 5.

Each printing station 4 is dedicated to the application of a single ink of a different color from that used in the other printing stations 4.

Figure 14:
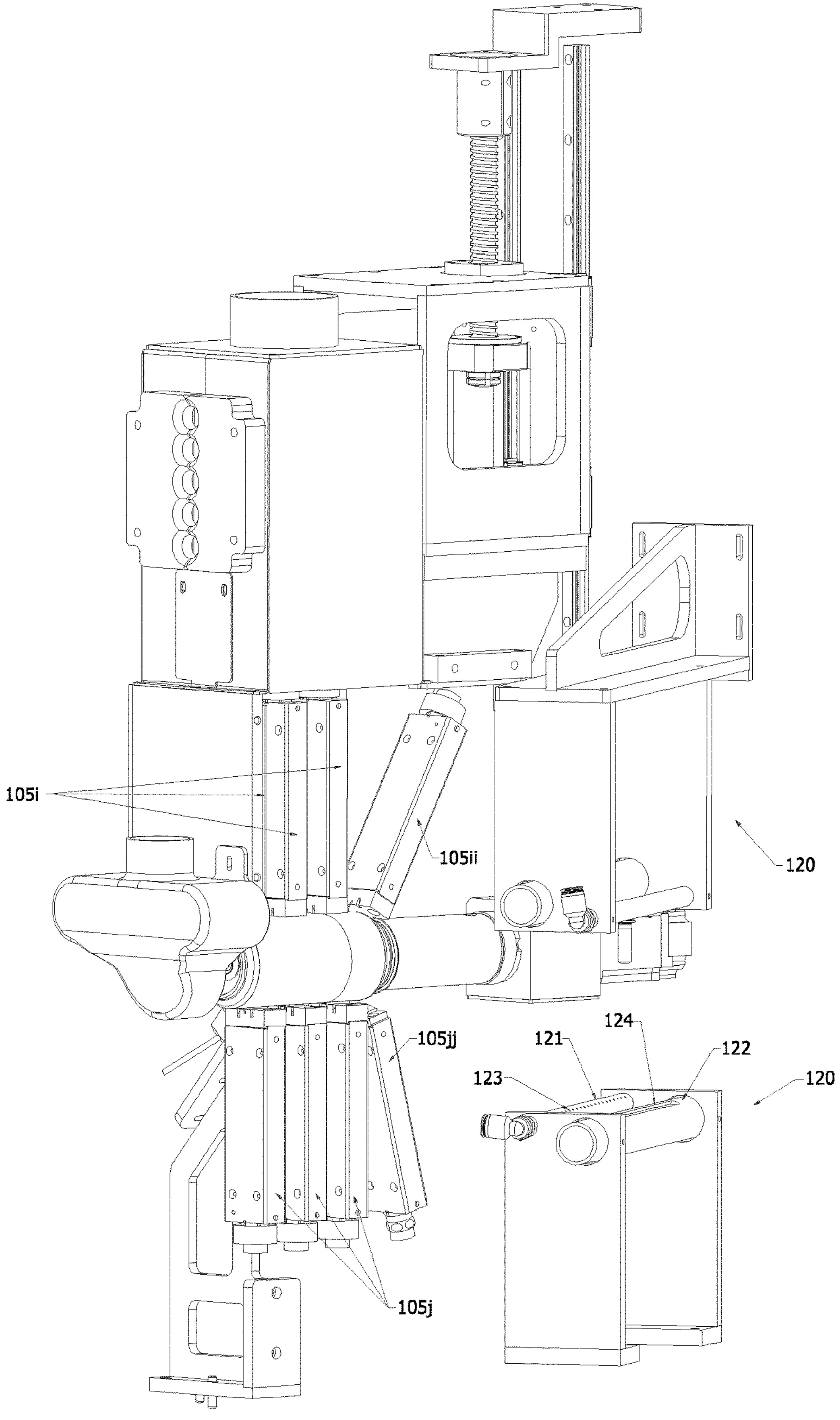
FIG. 14 shows a variant of the printing machine where a cooling station provided immediately downstream of the plasma treatment station.
Figure 15:
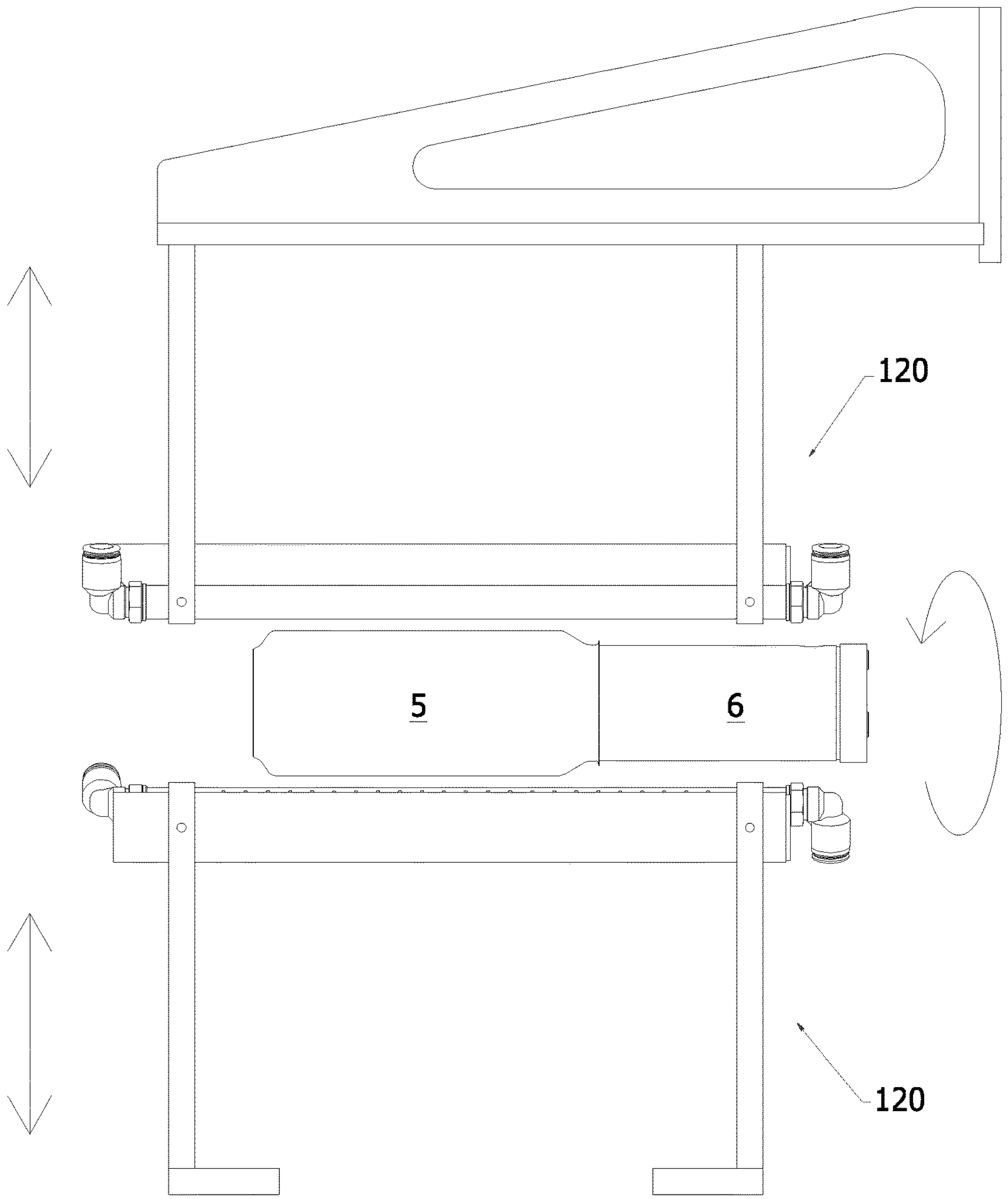
FIG. 15 shows a side elevation view of the cooling station in FIG. 14.
Figure 16:
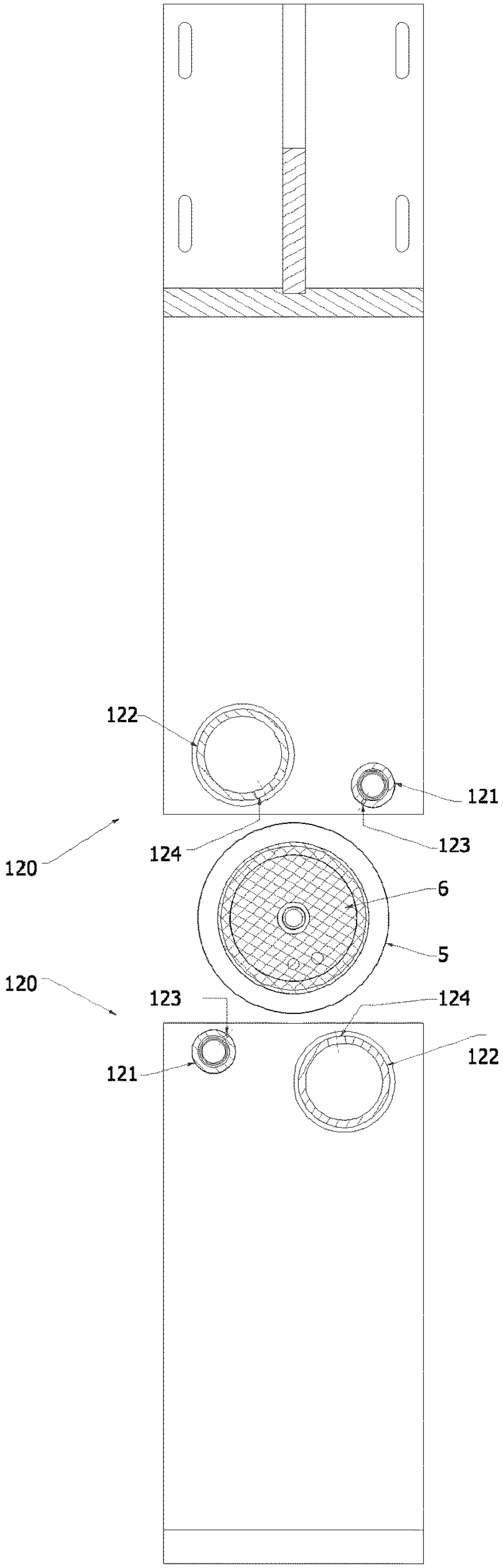
FIG. 16 shows a vertical cross-sectional view of the cooling station of FIG. 14.

FIGS. 14 to 16 show a cooling station of the containers 5 that can be positioned immediately downstream of the plasma station.

The cooling station comprises at least one cooling module 120 including a cooling compressed air emission pipe 121 and a heated air suction pipe 122.

The spindle 6 can be parked at the cooling station with axis M parallel to the axis of the emission pipe 121 and to the axis of the suction pipe 122.

The pipes 121, 122 are configured the one for a radial emission of air and the other one for a radial suction of air.

The emission pipe 121 has emission holes 123 distributed at least over most of the length of the emission pipe 121, while the suction pipe 122 has a suction slot 124 that extends at least over most of the length of the suction pipe 122.

The compressed air is dispensed by the emission pipe 121 in a direction towards the container 5 and the air stream heated by contact with the surface of the container 5 is sucked in by the suction pipe 122.

The direction of rotation on itself of the spindle 6, and consequently of the parked container 5 presses the cooling station, favors the transfer of the cooling air layer towards the suction slot 124.

Preferably, a cooling module 120 above and a cooling module 120 below the spindle 6 are envisaged.

Of course, the emission pipe 121 and the suction pipe 122 are connected respectively with appropriate compressed air distribution and smoke suction devices.

The cooling station is able to reduce the surface temperature of the container 5 to an optimal value for printing with inkjet technology.

The pretreatment device and the ink jet digital printing machine as conceived herein are susceptible to many modifications and variations, all falling within the scope of the inventive concept; further, all the details are replaceable by technically equivalent elements.

In practice, the materials used, as well as the dimensions, can be any according to the needs and the state of the art.

The invention claimed is:

1. An ink jet digital printing machine for printing on said at least one container, comprising:

a pretreatment device pretreating at least one container with a longitudinal axis having an outer surface to be subjected to ink jet digital printing, the pretreatment device comprising:

one or more plasma emitters, a table supporting at least one support spindle, the spindle supporting said at least one container, wherein said table has a rotation axis, wherein said at least one spindle has an axis oriented radially with respect to said rotation axis of said table, wherein said table is configured to carry and park said at least one spindle at an exposure position in which said outer surface of said at least one container is exposed to plasma emitted from the one or more plasma emitters;

at least one printing station provided with at least one printing head, wherein said table is configured to carry and park said at least one spindle at said at least one printing station in which said at least one spindle is rotatable around its axis, wherein said at least one spindle parked at said at least one printing station has its axis parallel to the longitudinal axis of said at least one printing head, the ink jet digital printing machine further comprising a pretreatment station in which said pretreatment device is positioned, and wherein said table is configured to carry and park said at least one spindle at said at least one pretreatment station before carrying and parking said at least one spindle at said at least one printing station; and a detection station for detecting an eccentricity profile of said at least one container, and including distance sensor supported by said at least one spindle rotating on itself, and wherein said table is configured to carry and park said at least one spindle at said at least one detection station for detecting the eccentricity profile before carrying and parking said at least one spindle at said at least one pretreatment station.

2. The ink jet digital printing machine according to claim 1, further comprising an actuation controller for controlling the actuation of a distance variation means for varying a radial distance at least of said first plasma emitting modules, said distance variation means configured to move at least said first modules, during rotation of said at least one spindle on itself at said at least one pretreatment station, with a motion law unequivocally determined by said eccentricity profile so as to maintain constant the distance of at least said first emitting modules from said at least one container.

3. The ink jet digital printing machine according to claim 1, wherein said table has a vertical rotation axis.

4. The ink jet digital printing machine according claim 1, further comprising, immediately downstream of said pretreatment station, a container cooling station comprising at least one cooling module including a cooling compressed air emission pipe and a heated air suction pipe, in that said spindle can be parked at said cooling station with said axis of said spindle parallel to an axis of the emission pipe and to an axis of the suction pipe.

5. The pretreatment device according to claim 1, wherein said exposure position at said at least one spindle is rotatable around its axis for the progressive exposure to the plasma of said outer surface of said at least one container.

6. The pretreatment device according to claim 1, wherein said one or more plasma emitters comprise composable plasma emitting modules.

7. The pretreatment device according to claim 6, wherein said plasma emitting modules are arranged in succession in a direction of the axis of the spindle and consecutive modules in the direction of the axis of the spindle have a section of overlap in the direction of the axis of the spindle.

8. The pretreatment device according to claim 7, wherein first plasma emitting modules of the plasma emitting modules are arranged at a first angular position around the axis of said spindle parked in said exposure position.

9. The pretreatment device according to claim 8, further comprising a direction variation means for varying an emission direction of said first plasma emitting modules.

10. The pretreatment device according to claim 9, further comprising a distance variation means for varying a radial distance of said first plasma emitting modules from the axis of said spindle parked in said exposure position.

11. The pretreatment device according to claim 8, further comprising one or more second plasma emitting modules arranged at a second angular position around the axis of said spindle parked in said exposure position.

12. The pretreatment device to claim 11, wherein said first emitting modules are in a position diametrically opposite of said one or more second modules with respect to the axis of said spindle.

* * * * *